Patented Jan. 23, 1940

2,188,259

UNITED STATES PATENT OFFICE 2,188,259

PREPARATION OF TITANIUM DIOXIDE PIGMENTS

Benjamin Wilson Allan, Baltimore, Md., assignor to American Zirconium Corporation, St. Helena, Baltimore, Md., a corporation of Maryland No Drawing. Application August 26, 1938, Serial No. 226,889

8 Claims. (Cl. 23—202)

The present invention relates to the production of titanium dioxide pigments and more specifically to the production of a titanium pigment of improved whiteness and color.

It is the general practice in the production of titanium dioxide to have a few grams per liter of reduced titanium in the titanium salt solution which is subjected to hydrolysis by boiling. The primary purpose of the reduced titanium in the solution is to assure at all times the absence of ferric iron which has been found to be preferentially adsorbed by the titanium dioxide during hydrolysis, and to adversely affect the color of the product when calcined. It has also been found expedient to have reduced titanium present during the filtration and washing of the titanium dioxide in order to facilitate the removal of the final traces of iron from the precipitate. Although this procedure has been found to be necessary to assure the removal of the iron from the filtered precipitate or acid cake, at the same time it has been found to be detrimental to the removal of other metallic impurities, particularly copper. Copper, as it is well known, can only exist in the metallic state in the presence of reduced titanium ion. Consequently, its removal from the acid cake is impossible because of the insolubility of metallic copper.

Recently it has been found that copper, even in traces, adversely affects the color of titanium dioxide on calcination. A method has been developed by means of which this copper can be made soluble and quantitatively removed without in any way harming the pigment properties of the titanium dioxide.

In accordance with the invention the acid cake which has been filtered and washed in the presence of reduced titanium to remove the iron, is treated with an oxidizing agent to oxidize the copper. The procedure is to form an aqueous slurry of the filtered and washed acid cake, add the oxidizing agent, preferably with boiling to expedite the reaction. The slurry is then filtered and washed with water. This treatment has been found to convert all of the metallic copper to the cupric condition which is very soluble in the slurry medium. It has also been observed that this oxidation treatment converts the small traces of manganese, chromium and other metals which form colored oxides upon calcination into ions of higher valence which then appear to be less easily adsorbed by the acid cake and consequently more easily removed by filtration.

Various oxidizing agents may be used, nitric acid, chlorates, persulfates, perborates, peroxides, etc., being suitable. The amounts used will vary somewhat upon the amount of copper in the acid cake, but amounts of about .05% to about .1% are ordinarily sufficient. More may be used, however, a sufficient amount being used to oxidize the metallic copper to the cupric state.

Example I

Titanium dioxide acid cake which had been filtered and washed in the presence of reduced titanium to remove the iron was slurried in water to give a slurry containing 100 grams of $TiO_2$ per liter. To this slurry 0.1% of commercial concentrated nitric acid, specific gravity 1.415 to 1.42 was added and the slurry boiled for one hour. The slurry was then filtered, washed with an amount of water twice that of the original slurry, and the washed material calcined. A blank was run at the same time in which no oxidizing agent was used. The results are shown by the following:

| Sample | Cu removed | Color after calcination |
|---|---|---|
| | Percent | |
| Blank | None | Brownish white. |
| Treated | .005 | Clean blue white. |

Example II

A solution 10% $H_2O_2$ was used and 1 cc. of this was added for each liter of slurry containing 100 grams $TiO_2$ per liter. The results were as follows:

| Sample | Cu removed | Color after calcination |
|---|---|---|
| | Percent | |
| Blank | None | Brownish white. |
| Treated | .006 | Clean blue white. |

Example III

Several tests were run on different acid cakes, using 1 cc. of a 10% solution for each liter of slurry containing 100 grams of $TiO_2$ per liter, and the results compared with untreated acid cakes. The results are shown in the following table:

Table I

| Sample | Treatment | Color after calcination | |
|---|---|---|---|
| | | Untreated | Treated |
| 1 | .1% $H_2O_2$ | Slight brown | Blue white. |
| 2 | do | do | Do. |
| 3 | do | Brown | Do. |

In order to determine whether or not the improvement in color was due to the removal of copper or not, varying quantities of copper sulfate were added to some of the acid cake purified in accordance with the above, and then calcined. In every case in which copper was added there was a decided loss in whiteness as shown by the following table:

Table II

| Sample | Cu added | Color after calcination |
| --- | --- | --- |
| | Percent | |
| 1 | .000 | Clean blue white. |
| 2 | .0005 | Slight cream. |
| 3 | .001 | Slight brown. |
| 4 | .005 | Dirty brown. |

From these results it is evident that the presence of copper in the acid cake adversely affects the color on calcination and that conversely the removal of copper from the acid cake before calcination is beneficial to the color.

It will be apparent that various modifications may be resorted to without departing from the spirit of the invention. For example, centrifuging or similar procedure may be employed in place of filtering and is the full equivalent thereof.

The invention is also applicable to the treatment of other acid cakes which contain reduced materials which prevent the formation of ferric ions, and which keep the copper in the metallic state. The invention in one of its broader phases is considered to reside in hydrolyzing, filtering and washing the acid cake under reducing conditions to maintain the iron in the ferrous state, and then subjecting the acid cake before calcination to oxidizing conditions to oxidize the metallic copper to the cupric state, so as to permit its removal by filtration:

Having described my invention what I claim is:

1. The process of improving the color of titanium dioxide pigments which comprises subjecting the freshly precipitated titanium dioxide containing ferrous iron and copper prior to calcination thereof to a washing treatment under reducing conditions to remove iron and to maintain the iron in the soluble ferrous state, thereafter subjecting the iron freed precipitate to an oxidizing treatment to oxidize the copper present to the cupric state, filtering and washing the so treated titanium dioxide precipitate to remove the soluble cupric copper and then calcining the thus purified titanium dioxide precipitate.

2. In the process of preparing titanium dioxide of improved color from a titanium dioxide acid cake containing ferrous iron and copper, the steps comprising washing the acid cake under reducing conditions until substantially all of the iron is washed out, thereafter treating the washed material with an oxidizing agent to convert the copper to the cupric state, and again washing the thus treated material to remove the soluble cupric copper.

3. In the process of preparing titanium dioxide of improved color from titanium dioxide acid cake containing ferrous iron and copper, the steps comprising washing the acid cake in the presence of titanous ions until substantially all of the iron is removed, thereafter treating the washed material with an oxidizing agent to convert the copper to the cupric state, and again washing the thus treated material to remove the cupric copper.

4. The process of preparing titanium dioxide pigment of improved color which comprises washing uncalcined titanium dioxide material containing iron in the ferrous state and copper under reducing conditions until substantially all of the iron is removed, thereafter treating the washed material with an oxidizing agent to convert the copper to the cupric state, again washing the thus treated material to remove cupric copper, and calcining the thus purified titanium dioxide material.

5. The process of preparing titanium dioxide pigment of improved color which comprises washing uncalcined titanium dioxide material containing iron in the ferrous state and copper in the presence of titanous ions until substantially all of the iron is removed as ferrous iron, thereafter treating the washed material with an oxidizing agent to convert copper present to the cupric state, again washing the thus treated material to remove cupric copper, and calcining the thus purified titanium dioxide material.

6. The process of preparing titanium dioxide pigment of improved color which comprises washing uncalcined titanium dioxide material containing iron in the ferrous state and copper while maintaining the iron in the ferrous state until substantially all of the iron is removed, thereafter treating the washed material with an oxidizing agent to convert the copper to the cupric state, again washing the thus treated material to remove the cupric copper, and calcining the thus purified titanium dioxide material.

7. The process of claim 6 in which the oxidizing agent is selected from the class consisting of nitric acid, persulfates, perborates and peroxides.

8. The process of preparing titanium dioxide pigment of improved color, which comprises washing uncalcined titanium dioxide material containing iron in the ferrous state and copper under reducing conditions until substantially all of the iron is removed, forming a slurry of the thus washed material containing an oxidizing agent, boiling the slurry to effect oxidation of the copper to the cupric state, washing the thus treated material to remove cupric copper, and calcining the thus purified titanium dioxide material.

BENJAMIN WILSON ALLAN.